(12) United States Patent
Nishizawa

(10) Patent No.: US 7,971,772 B2
(45) Date of Patent: Jul. 5, 2011

(54) METHOD OF BRAZING PIPE MEMBER TO COUNTERPART MEMBER

(75) Inventor: Hiroyuki Nishizawa, Numazu (JP)

(73) Assignee: Usui Kokusai Sangyo Kaisha, Ltd., Shizuoka-Ken (JP)

( * ) Notice: Subject to any disclaimer, the term of this patent is extended or adjusted under 35 U.S.C. 154(b) by 271 days.

(21) Appl. No.: 11/713,855

(22) Filed: Mar. 5, 2007

(65) Prior Publication Data

US 2007/0221708 A1     Sep. 27, 2007

(51) Int. Cl.
*B23K 35/12*     (2006.01)
(52) U.S. Cl. .......... 228/246; 228/245; 228/41; 165/153; 29/892.03
(58) Field of Classification Search .................. 228/245, 228/246, 251, 255, 41, 183; 29/890.03, 890.054; 165/153; 285/124.1
See application file for complete search history.

(56) References Cited

U.S. PATENT DOCUMENTS

| | | | | |
|---|---|---|---|---|
| 2,148,747 | A * | 2/1939 | Hampe et al. .............. | 29/890.14 |
| 3,327,892 | A * | 6/1967 | Lloyd et al. ................... | 220/612 |
| 4,396,213 | A * | 8/1983 | Hawkins .................... | 285/289.3 |
| 4,858,686 | A * | 8/1989 | Calleson ...................... | 165/173 |
| 5,176,410 | A * | 1/1993 | Beyer .......................... | 285/187 |
| 5,439,257 | A * | 8/1995 | Williamson ................ | 285/288.1 |
| 6,286,213 | B1 * | 9/2001 | Hada et al. ................ | 29/890.044 |
| 6,631,740 | B1 * | 10/2003 | Jackson et al. ................ | 138/109 |
| 6,701,598 | B2 * | 3/2004 | Chen et al. .................. | 29/421.1 |
| 6,948,455 | B2 * | 9/2005 | Ferguson et al. .......... | 122/367.3 |
| 7,380,327 | B2 * | 6/2008 | Snow et al. ..................... | 29/521 |
| 7,475,829 | B2 * | 1/2009 | Hardt et al. ...................... | 239/1 |
| 2004/0124232 | A1 * | 7/2004 | Gropallo ....................... | 228/246 |
| 2006/0185167 | A1 * | 8/2006 | Lippa et al. .............. | 29/890.038 |

FOREIGN PATENT DOCUMENTS

| | | | |
|---|---|---|---|
| DE | 3112081 | * | 10/1982 |
| JP | 61-092773 | | 5/1986 |
| JP | 2-059171 | | 2/1990 |

OTHER PUBLICATIONS

Machine translation of DE 3112081, Johann et al., Oct. 1982.*

* cited by examiner

*Primary Examiner* — Roy King
*Assistant Examiner* — Michael Aboagye
(74) *Attorney, Agent, or Firm* — Jordan and Hamburg LLP

(57) ABSTRACT

A method of brazing a pipe member to a counterpart member includes steps of mounting in a circumferential direction an engaging portion in a ring shape to an outer periphery of the pipe end portion proximate an endmost portion of the pipe member, engaging a brazing-filler-metal-made ring in a ring shape with the engaging portion, inserting the pipe end portion of the pipe member provided with the brazing-filler-metal-made ring into the counterpart member, heating and melting the brazing-filler-metal-made rug with the outer peripheral surface of the pipe end portion being in abutment with the inner peripheral surface of the counterpart member, pouring a brazing filler metal into an abutment portion between the outer peripheral surface of the pipe end portion and the inner peripheral surface of the counterpart member, and securing by brazing the pipe end portion to the counterpart member.

8 Claims, 12 Drawing Sheets

METHOD OF BRAZING PIPE MEMBER TO COUNTERPART MEMBER

BACKGROUND OF THE INVENTION

1. Field of the Invention

This invention relates to a method of brazing a pipe end portion of a metal pipe, which is generally used as a supply channel for automobiles or various machines, devices, or the like, to a counter member into which the pipe end portion is inserted to connect the metal pipe and the counter member.

2. Description of Related Art

To connect a pipe end portion, which is a vicinity of a pipe endmost portion of a pipe member, to an interior of a counterpart member securely, such a method has been generally taken that an outer peripheral surface of the pipe end portion and an inner peripheral surface of the counterpart member, in which a portion therebetween is defined as an abutment portion, are securely connected by brazing or soldering. Furthermore, a method as disclosed in Patent Document 1 has been widely known. In this method, the pipe end portion of the pipe member is inserted into the counterpart member and this inserted part of the pipe member is subjected to a swaging process from an exterior of the counterpart member to temporarily secure the pipe end portion and the counterpart member. The pipe member and the counterpart member are immersed in a melted metal to secure a connected part between the pipe member and the counterpart member as well as to form a metal coating on surfaces of the pipe member and the counterpart member.

As disclosed in Patent Document 2, a following method has also been widely known. That is, an expanded diameter portion in a ring shape is formed to an outer periphery of the pipe end portion of the pipe member to brought the expanded diameter portion into abutment with an inner peripheral surface of the counterpart member in an engaging manner by inserting the pipe end portion into a counterpart member so as to temporarily secure the pipe end portion of the pipe member and the counterpart member to each other. At the same time, a brazing filler metal is provided between an outer peripheral surface of the pipe member at the vicinity of the abutment portion and the inner peripheral surface of the counterpart member. The brazing filler metal is melted to braze the abutment portion between the expanded diameter portion of the pipe end portion and the inner peripheral surface of the counterpart member so that the outer peripheral surface of the pipe end portion and the inner peripheral surface of the counterpart member are securely connected.

Patent Document 1 is Japanese Patent Laid-Open No. 61-92773. Patent Document 2 is Japanese Patent Laid-Open No. 2-59171.

According to the invention disclosed in Patent Document 1, however, the pipe member and the counter member are immersed in the melted metal to cover the entire surface of both members with the metal. In this manner, the metal covers unnecessary parts, thereby causing waste. Furthermore, where the metal used for covering has a low corrosion resistance, the surface is required to be covered again with the metal with a high corrosion resistance. As a result, the production takes time and trouble while requiring a high production cost. Yet further, there is a case where the extra melted metal remains at the connected part between the pipe member and the counterpart member. In this case, there has been a fear that the remaining metal narrows a flow channel for liquid or gas that flows through the connected part between the pipe member and the counterpart member.

According to the invention disclosed in Patent Document 2, furthermore, since the brazing filler metal provided between the outer peripheral surface of the pipe member and the inner peripheral surface of the counterpart member is not positioned by securing or the like, there arises a case where the brazing filler metal is shifted to a position different from a desired position at the time of brazing operation. In this case, it has been difficult to perform the brazing operation to the desired position with accuracy.

This invention aims to solve the aforementioned problems and to provide a method of brazing the pipe member to the counterpart member, in which the pipe end portion of the pipe member and the counterpart member can be certainly secured by brazing at the desired position while this brazing operation is performed at a low cost without time and trouble.

SUMMARY OF THE INVENTION

To solve the aforementioned problems, according to the first aspect of this invention, a method of brazing a pipe member to a counterpart member by brazing an outer peripheral surface of a pipe end portion of the pipe member to an inner peripheral surface of the counterpart member, the method comprising the steps of mounting in a circumferential direction an engaging portion in a ring shape to an outer periphery of the pipe end portion, as vicinity of a pipe endmost portion of the pipe member, disposing a brazing-filler-metal-made ring in a ring shape to the engaging portion in an engaging manner, inserting the pipe end portion of the pipe member provided with the brazing-filler-metal-made ring into the counterpart member, heating and melting the brazing-filler-metal-made ring of the pipe end portion in a state where the outer peripheral surface of the pipe end portion is brought into abutment with the inner peripheral surface of the counterpart member, pouring a brazing filler metal into an abutment portion between the outer peripheral surface of the pipe end portion and the inner peripheral surface of the counterpart member, and securing by brazing the pipe end portion to the counterpart member.

According to the second aspect of the invention, a method of brazing a pipe member to a counterpart member by brazing an outer peripheral surface of a pipe end portion of the pipe member to an inner peripheral surface of the counterpart member, the method comprising the steps of mounting in a circumferential direction an engaging portion in a ring shape, which is inwardly concave formed, to an outer periphery of the pipe end portion as a vicinity of a pipe endmost portion of the pipe member, providing by slipping a brazing-filler-metal-made ring in a ring shape over the engaging portion, inserting the pipe end portion of the pipe member provided with the brazing-filler-metal-made ring into the counterpart member, heating and melting the brazing-filler-metal-made ring of the pipe end portion in a state where the outer peripheral surface of the pipe end portion is brought into abutment with the inner peripheral surface of the counterpart member, pouring a brazing filler metal into an abutment portion between the outer peripheral surface of the pipe end portion and the inner peripheral surface of the counterpart member, and securing by brazing the pipe end portion to the counterpart member.

According to the third aspect of the invention, a method of brazing a pipe member to a counterpart member by brazing an outer peripheral surface of a pipe end portion of the pipe member to an inner peripheral surface of the counterpart member, the method comprising the steps of mounting in a circumferential direction an engaging portion in a ring shape, which is outwardly projecting, to an outer periphery of the pipe end portion as a vicinity of a pipe endmost portion of the pipe member, providing a brazing-filler-metal-made ring in a ring shape, which is formed in a manner to have an inner diameter set to smaller than an outer diameter of the engaging portion, to an interval between the engaging portion and the pipe endmost portion or to a side opposite to the pipe endmost portion with the engaging portion intervened, inserting the pipe end portion of the pipe member provided with the brazing-filler-metal-made ring into the counterpart member, providing the engaging portion of the pipe end portion to the inner circumferential surface of the counterpart member in an engaging manner, heating and melting the brazing-filler-metal-made ring of the pipe end portion, pouring a brazing filler metal into an abutment portion between the outer peripheral surface of the pipe end portion and the inner peripheral surface of the counterpart member, and securing by brazing the pipe end portion to the counterpart member.

According to the fourth aspect of the invention, a method of brazing a pipe member to a counterpart member by brazing an outer peripheral surface of a pipe end portion of the pipe member to an inner peripheral surface of the counterpart member, the method comprising the steps of mounting in a circumferential direction an engaging portion in a ring shape, which is outwardly projecting, to an outer periphery of the pipe end portion as a vicinity of a pipe endmost portion of the pipe member, forming an expanded diameter portion by expanding a diameter of the pipe member at a side of the pipe endmost portion compared with that of the engaging portion, providing by slipping a brazing-filler-metal-made ring in a ring shape between the expanded diameter portion and the engaging portion, inserting the pipe end portion of the pipe member provided the brazing-filler-metal-made ring into the counterpart member, providing by bringing the engaging portion or the expanded diameter portion into abutment with the inner peripheral surface of the counterpart member, and heating and melting the brazing-filler-metal-made ring of the pipe end portion, and securing by brazing the outer peripheral surface of engaging portion and the inner peripheral surface of the counterpart member.

In this manner, the pipe member may be deformed together with the brazing-filler-metal-made ring into a noncircular shape by pushing the pipe end portion together with the brazing-filler-metal-made ring in a direction of an axial center from an exterior so that the pipe member is inserted into the counterpart member.

This invention is structured as described above. In the method of brazing the pipe member to the counterpart member according to this invention, the engaging portion in a ring shape is mounted in a circumferential direction to the outer periphery of the pipe end portion as the vicinity of the pipe endmost portion of the pipe member. The brazing-filler-metal-made ring in a ring shape is then provided to this engaging member in an engaging manner, so that the brazing-filler-metal-made ring can be easily positioned with respect to the pipe end portion. Furthermore, the brazing-filler-metal-made ring thus provided to the engaging portion is subjected to the heating and melting process to certainly braze only the abutment portion between the pipe member and the counterpart member. Thus, the pipe end portion and the counterpart member can be secured by brazing at a low cost without wasting the brazing filler metal while the brazing at the predetermined position can be performed easily and certainly.

Furthermore, where a deep portion in the counterpart member or an interior of the counterpart member, which is a sealed container-like shape, is secured by brazing, it is difficult to view these brazed parts after the brazing in some cases. However, a user views a status that the brazing-filler-metal-made ring is provided to the vicinity of the pipe endmost portion in an engaging manner when incorporating the pipe member into the counterpart member, thereby eliminating the need for checking the brazed parts even in the aforementioned cases, so that time and trouble at the time of manufacturing can be saved.

BRIEF DESCRIPTION OF THE DRAWINGS

This invention may take physical form in certain parts and arrangements of parts, a preferred embodiment and method of which will be described in detail in this specification and illustrated in the accompanying drawings which form a part hereof, and wherein.

DESCRIPTION OF PREFERRED EMBODIMENTS

First Embodiment

Figure 1:
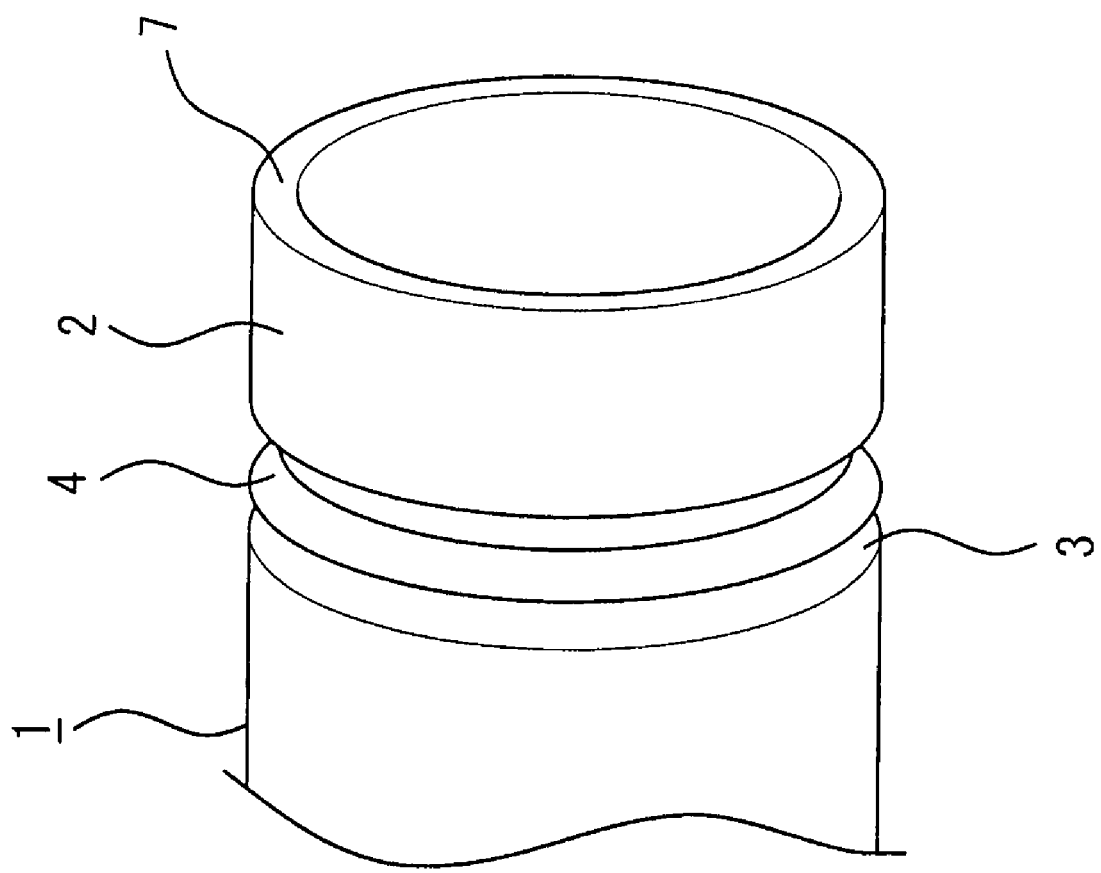
FIG. 1 is a perspective view of a pipe member provided with a brazing-filler-metal-made ring according to a first embodiment of a first aspect of this invention.

A first embodiment showing a first aspect of this invention will be explained with reference to FIGS. 1, 2, and 3. Numeral 1 is a pipe member in a cylindrical shape. An engaging portion 3 in a ring shape, which is inwardly formed in a concave manner, is mounted to an outer periphery of a pipe end portion 2 at one end of the pipe member 1 in a circumferential direction of the pipe member 1, as shown FIG. 1. Furthermore, independently from the pipe member, a brazing-filler-metal-made ring 4 is formed by shaping a wire-formed brazing filler metal into a ring shape in a manner to have an inner diameter set to smaller than an outer diameter of the pipe end portion 2.

The brazing-filler-metal-made ring 4 is elastically deformed to expand the diameter thereof to be slightly larger than an outer diameter of the pipe end portion 2. In this condition, the pipe member 1 is thrust into the brazing-filler-metal-made ring 4 to be inserted therein from a side of the pipe end portion 2 such that the brazing-filler-metal-made ring 4 is provided in an engaging manner to the engaging portion 3 of the pipe end portion 2. Since an inner diameter of the brazing-filler-metal-made ring 4 is set to smaller than the outer diameter of the pipe member 2, the brazing-filler-metal-made ring 4 provided to the engaging portion 3 elastically recovers, thereby remaining within the engaging portion 3 in a state of being hardly detachable from the engaging part 3.

Figure 2:
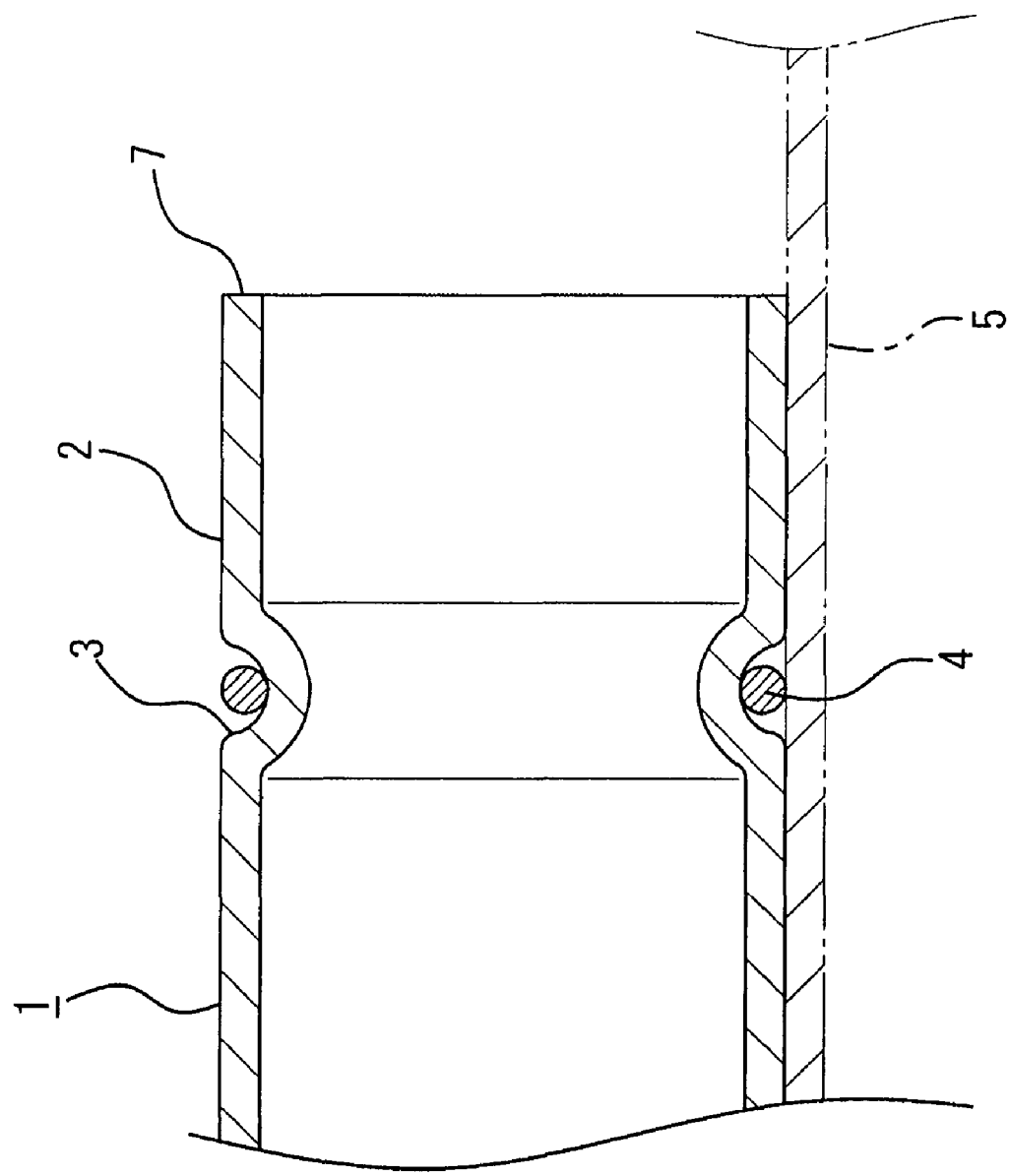
FIG. 2 is a cross-sectional view of the pipe member mounted with the brazing-filler-metal-made ring and provided inside a counterpart member according to the first embodiment.
Figure 3:
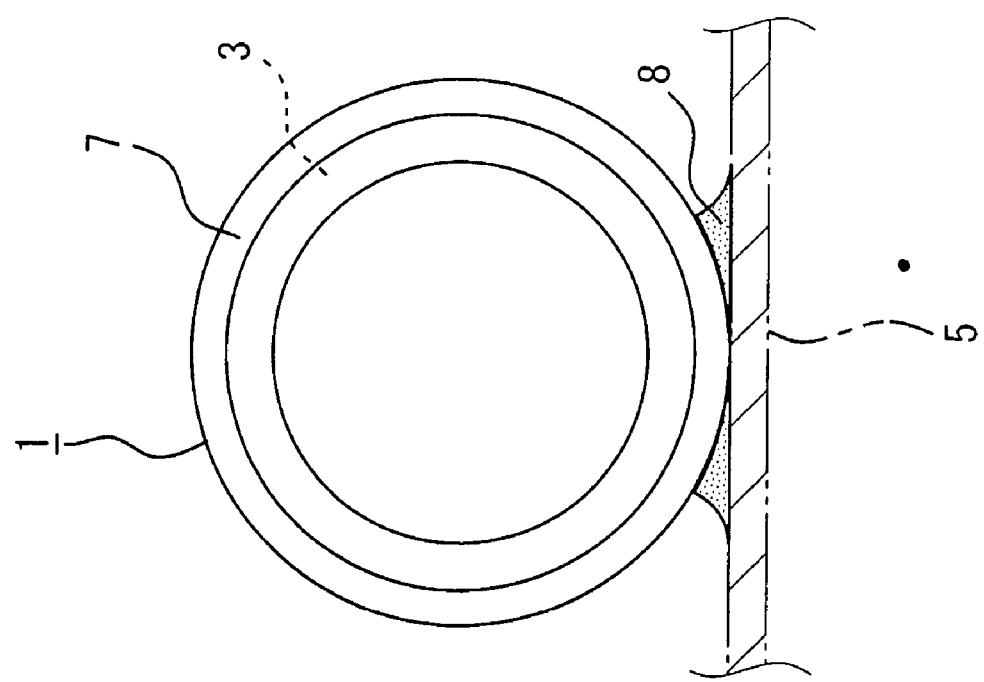
FIG. 3 is an end view of the pipe member secured by brazing to the counterpart member according to the first embodiment.
Figure 8:
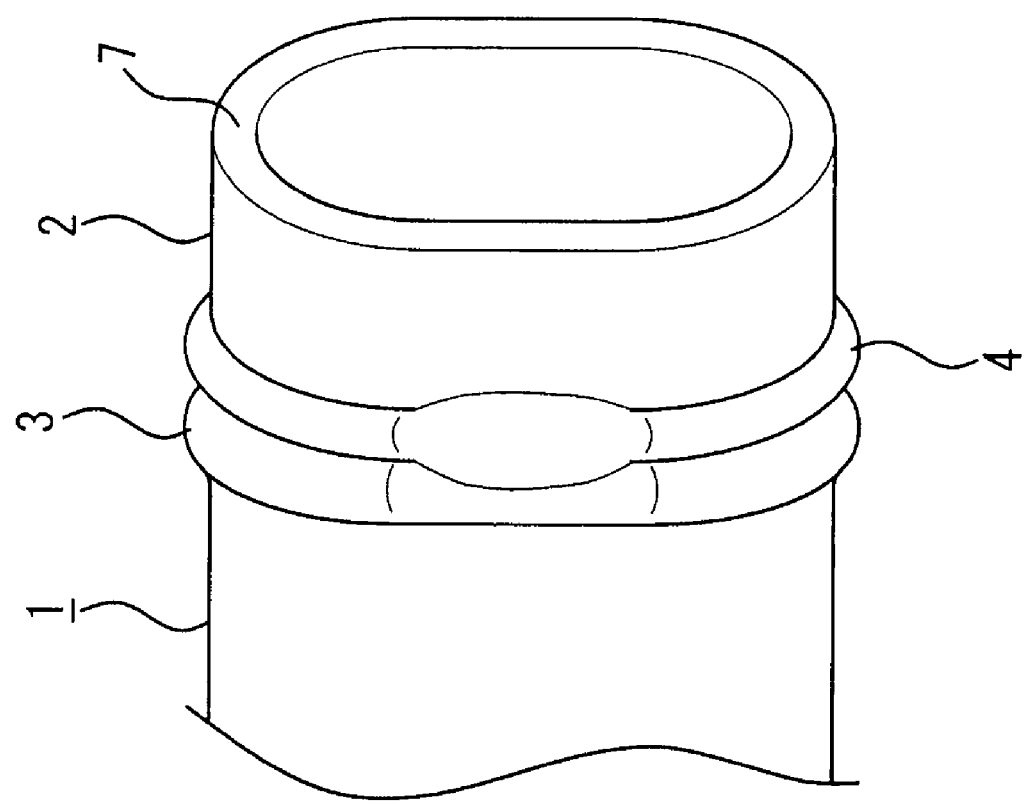
FIG. 8 is a perspective view of a pipe member provided with a brazing-filler-metal-made ring according to a fourth embodiment of the third aspect of this invention.

The pipe end portion 2 of the pipe member 1 provided with the brazing-filler-metal-made ring 4 in an engaging manner as described above, is inserted in the counterpart member 5 while an outer peripheral surface of the pipe member 2 that is inserted into the counterpart member 5 is brought into abutment with an inner peripheral surface of the counterpart member 5, as shown in FIG. 2. In this state, the brazing-filler-metal-made ring 4 provided to the pipe end portion 2 is subjected to a melting process inside a heating furnace or the like, in which the brazing-filler-metal-made ring 4 is heated at a higher temperature than a melting point. Thus, the brazing filler metal is melted and poured into an abutment portion between the outer peripheral surface of the pipe end portion 2 and the inner peripheral surface of the counterpart member 5 to secure by brazing the abutment portion with a brazing portion 8 which has been melted and solidified, as shown in FIG. 8.

At this time, since the brazing-filler-metal-made ring 4 is provided to the engaging portion 3 in a hardly detachable manner as described above, the brazing-filler-metal-made ring 4 is hardly detached from the pipe end portion 2 during the brazing operation in sequence. As a result, the brazing operation can be certainly performed to a target portion. Therefore, the brazing-filler-metal-made ring 4 can be easily positioned with respect to the pipe end portion 2 while the pipe end portion 2 and the counterpart member 5 can be easily secured to each other by brazing at a low cost without wasting the brazing filler metal.

Second Embodiment

In the first embodiment, the engaging portion 3 in a ring shape is formed in a concave manner to the pipe end portion 2 of the pipe member 1 in a cylindrical shape and the brazing-filler-metal-made ring 4 is provided to the engaging member 3, thereby brazing the pipe end portion 2 to the counterpart member 5. In a second embodiment of a second aspect of the invention, although the brazing-filler-metal-made ring 4 is provided to the engaging portion 3 of the pipe end portion 2 in the same manner as that of the first embodiment, the pipe end portion 2 provided with the brazing-filler-metal-made ring 4 is deformed in a manner to have a cross section in an oblong shape as a noncircular shape.

Figure 4:
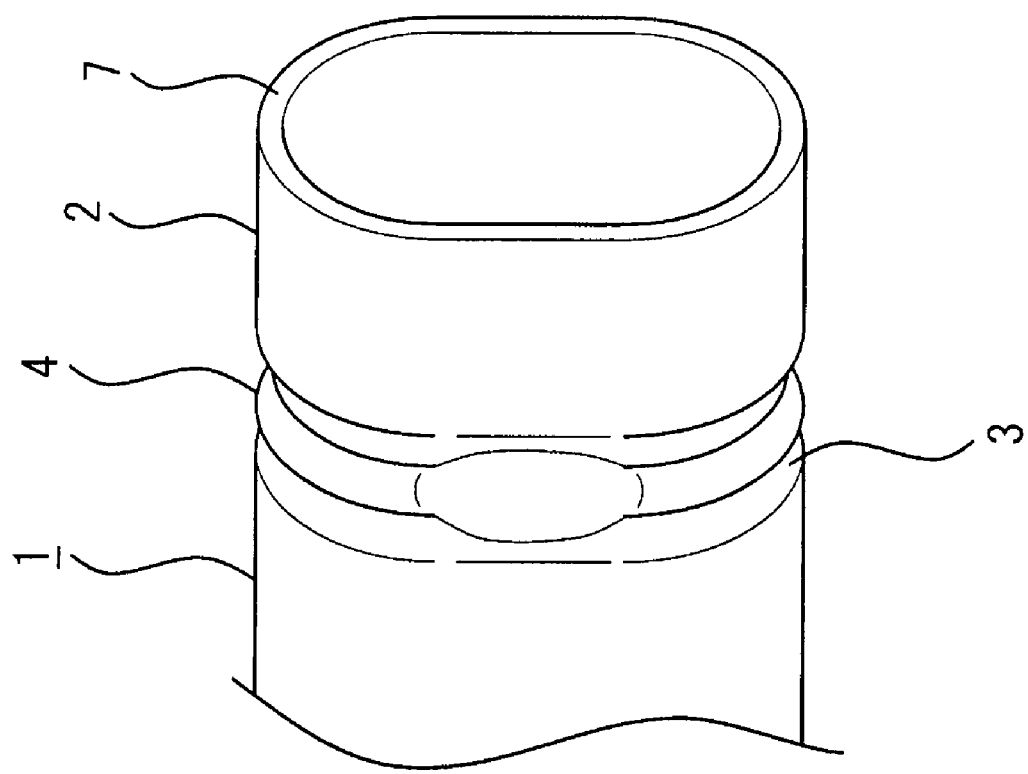
FIG. 4 is a perspective view of a pipe member provided with a brazing-filler-made ring according to a second embodiment of a second aspect of this invention.
Figure 5:
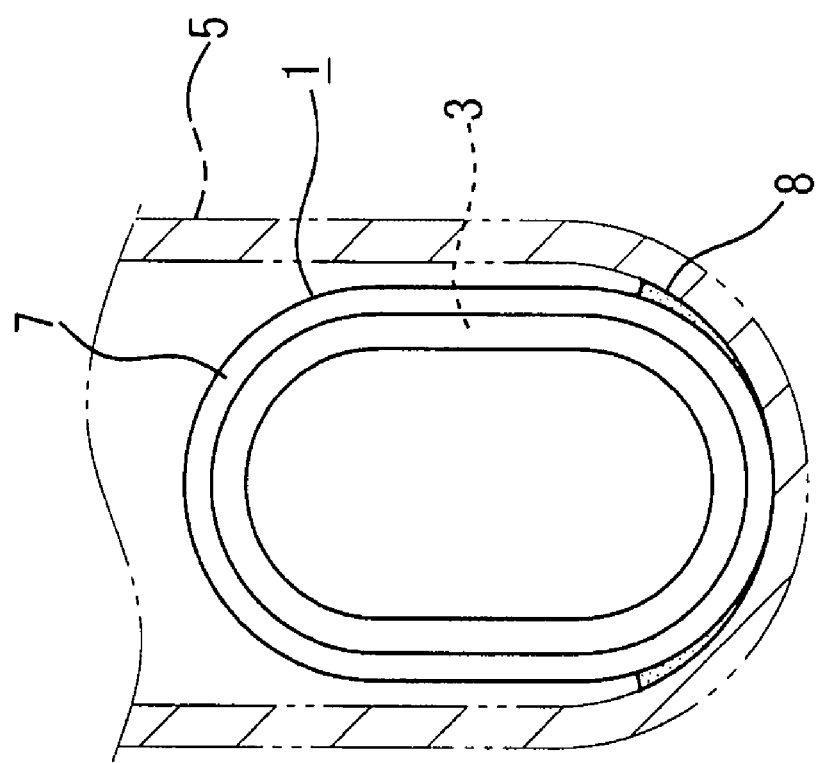
FIG. 5 is an end view of a pipe member secured by brazing to the counterpart member according to the second embodiment.

This embodiment will be explained with reference to FIGS. 4 and 5. The engaging portion 3 in a ring shape, which is similar to that of the first embodiment, is formed in a concave manner to the pipe end portion 2 of the pipe member 1 in a cylindrical shape. After providing the brazing-filler-metal-made ring 4 to this engaging portion 3, the pipe end portion 2 of the pipe member 1 is then pushed in a direction of an axial center from the exterior through the brazing-filler-metal-made ring 4 so that the pipe end portion 2 is deformed together with the brazing-filler-metal-made ring 4 in a manner to have a cross section in an oblong shape, as shown in FIG. 4. It is to be noted that since the brazing filler metal is generally soft, a part becomes flattened by pushing in the case of thick wire diameter, as shown in FIG. 4. This pipe end portion 2 is provided and inserted into the counterpart member 5 in a state where the outer peripheral surface of the pipe end portion 2 and the inner peripheral surface of the counterpart member 5 are brought into abutment with each other. In this state, the brazing-filler-metal-made ring 4 is subjected to the melting process, in which the brazing-filler-metal-made ring 4 is heated inside the heating furnace or the like, causing the brazing filler metal to be melted and poured into the abutment portion between the pipe end portion 2 and the counterpart portion 5. As a result, this abutment portion is secured by the brazing portion 8, which has been melted and solidified.

Since the brazing-filler-metal-made ring 4 provided to the engaging portion 3 is secured into the engaging portion 3 more tightly by deforming the pipe end portion 2 of the pipe member 1 together with the brazing-filler-metal-made ring 4 in a manner to have a cross section in an oblong shape, the brazing-filler-metal-made ring 4 is hardly detached from the engaging portion 3 during the brazing operation, so that brazing at the predetermined position becomes more certain.

Third Embodiment

In the above first and second embodiments, the outer periphery of the pipe end portion 2 is mounted with the engaging portion 3 in a ring shape that is inwardly formed in a concave manner while the brazing-filler-metal-made ring 4 is provided to the engaging portion 3. In a third embodiment of a third aspect of the invention, however, the outer periphery of the pipe end portion 2 is mounted with the engaging portion 3 in a ring shape which is outwardly formed in a projecting manner, and the brazing-filler-metal-made ring 4 is provided to the engaging portion 3 in an engaging manner.

Figure 6:
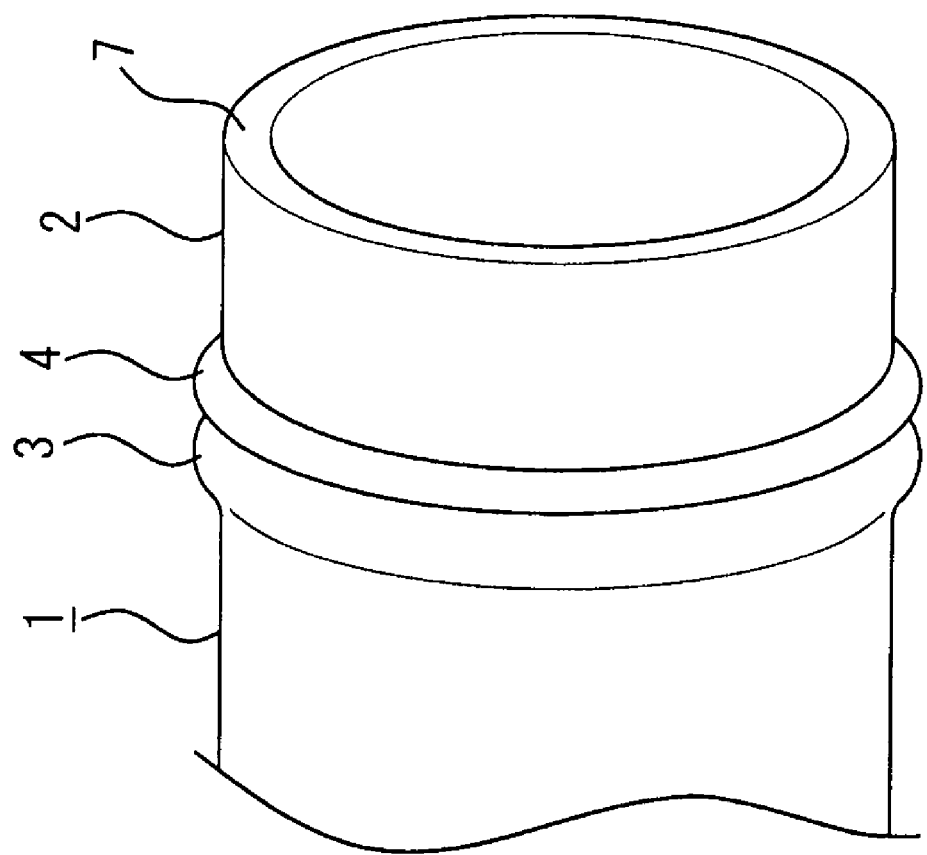
FIG. 6 is a perspective view of a pipe member provided with a brazing-filler-made ring according to a third embodiment of a third aspect of this invention.
Figure 7:
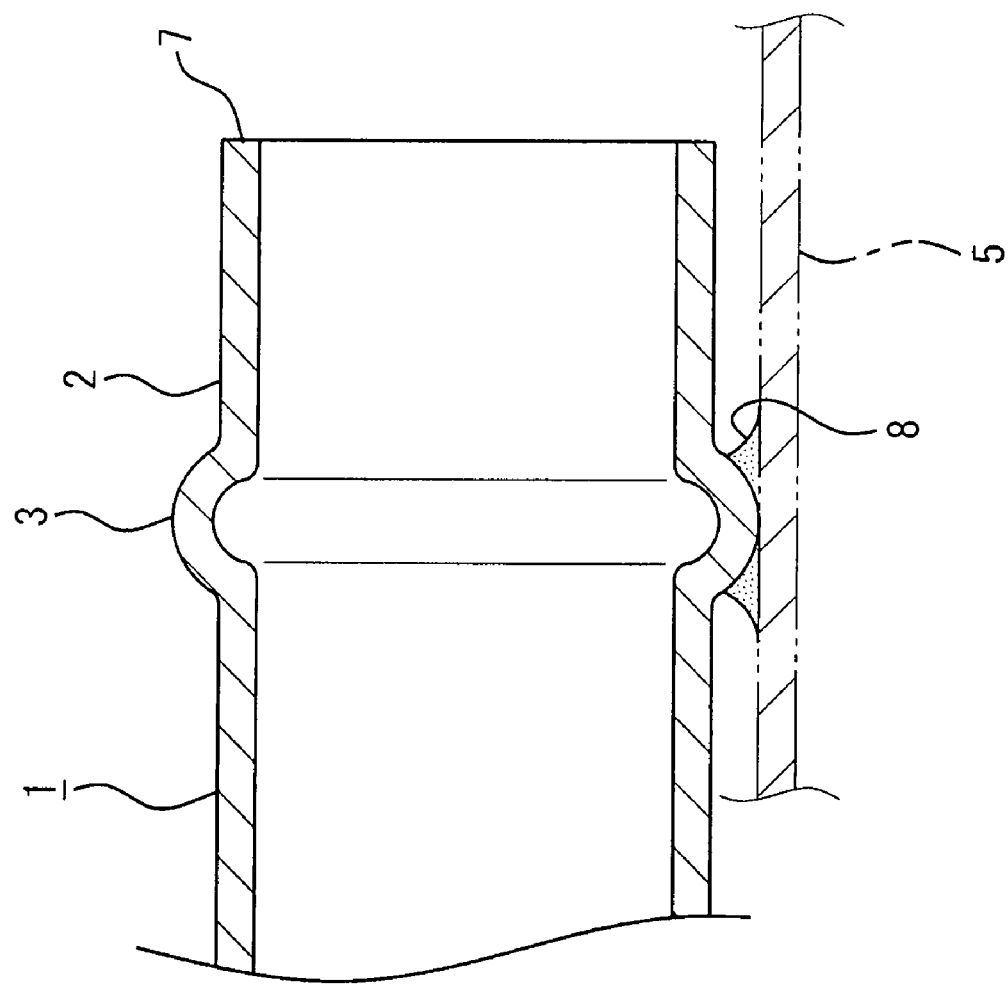
FIG. 7 is a cross-sectional view of a pipe member secured by brazing to the counterpart member according to the third embodiment.

The third embodiment will be explained in more detail with reference to FIGS. 6 and 7. As shown in FIG. 6, the engaging portion 3 in a ring shape is formed in an outwardly projecting manner to the outer periphery of the pipe end portion 2 in a circumferential direction. The brazing-filler-metal-made ring 4 in a ring shape, which has a diameter thereof desirably set to slightly smaller than the outer diameter of the pipe member 1, is provided in an engaging manner between the engaging portion 3 and a pipe endmost portion. The pipe end portion 2, in which the brazing-filler-metal-made ring 4 is provided in an engaging manner to the engaging portion 3, is inserted into the counterpart member 5 while the outer peripheral surface of the engaging portion 3 is brought into abutment with the inner peripheral surface of the counterpart member 5. It is to be noted the brazing-filler-metal-made ring 4 is provided in an engaging manner between the engaging portion 3 and the pipe endmost portion 7 in this embodiment as described above but may be provided next to one side of the engaging portion 3 in other different embodiments, namely the side opposite to the pipe endmost portion 7 in which is the engaging portion 3 intervened.

The brazing-filler-metal-made ring 4 provided in an engaging manner to the engaging portion 3 is subjected to the heating and melting process. As shown in FIG. 7, the brazing filler metal is then melted and poured into the abutment portion between the outer peripheral surface of the engaging portion 3 and the inner peripheral surface of the counterpart member 5, thereby securing the abutment portion with the brazing portion 8 having been melted and solidified. As described above, the engaging portion 3, which is outwardly projecting, is mounted to the outer periphery of the pipe end portion 2, and the brazing-filler-metal-made ring 4 is provided in an engaging manner to the vicinity of the engaging portion 3 so that the brazing-filler-metal-made ring 4 can be easily positioned with respect to the pipe end portion 2.

Fourth Embodiment

In the third embodiment, the engaging portion 3 in a ring shape is formed in a projecting manner to the pipe end portion 2 of the pipe member 1 in a cylindrical shape while the brazing-filler-metal-made ring 4 is provided between the engaging portion 3 and the pipe endmost portion 7 to perform the brazing. In a fourth embodiment of a third aspect of the invention, although the brazing-filler-metal-made ring 4 is provided between the engaging portion 3 and the pipe endmost portion 7 both in a ring shape in a manner similar to that of the third embodiment, the pipe end portion 2 is deformed in this state so as to have a cross section in an oblong shape, and thereafter the brazing is performed.

Figure 9:
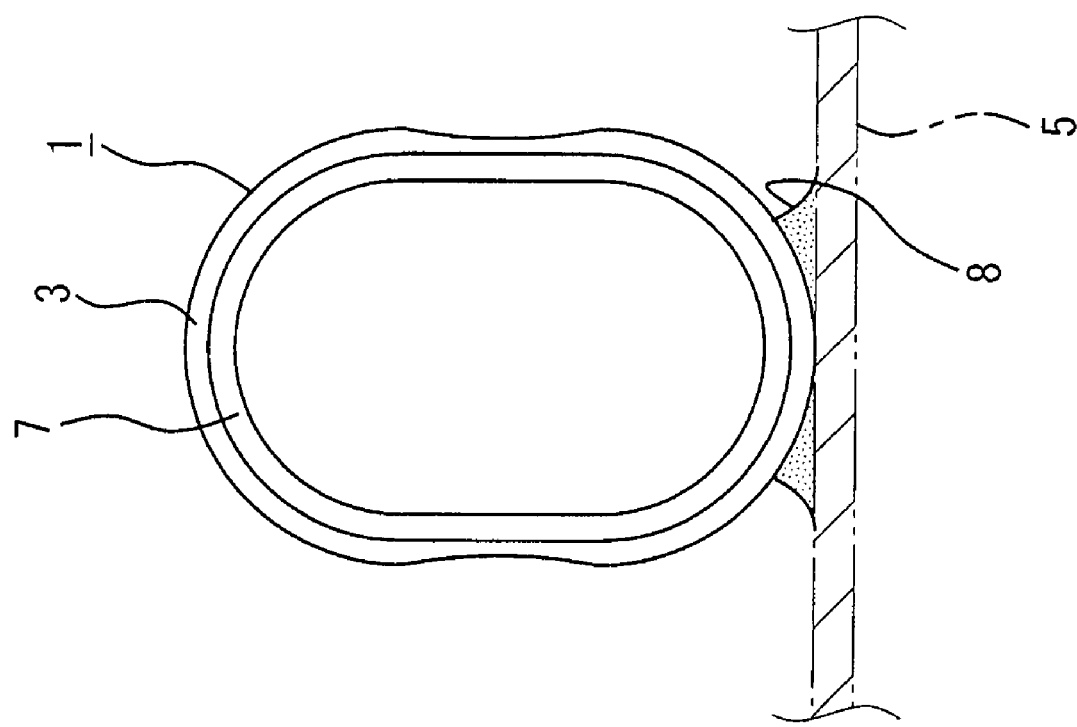
FIG. 9 is an end view of the pipe member secured by brazing to a counterpart member according to the fourth embodiment.

This embodiment will be explained in more detail with reference to FIGS. 8 and 9. The engaging portion 3 is formed in a projecting manner to the pipe end portion 2 of the pipe member 1 in a cylindrical shape, and the brazing-filler-metal-made 4 is provided in an engaging manner to the engaging portion 3 between the engaging portion 3 and the pipe endmost portion 7. The pipe end portion 2 of the pipe member 1 is then pushed in a direction of the axial center from the exterior through the brazing-filler-metal-made 4 so that the pipe end portion 2 is deformed together with the brazing-filler-metal-made ring 4 in a manner to have a cross section in an oblong shape, as shown in FIG. 8. The pipe member 1 having been deformed in this manner is provided and inserted into the counterpart member 5 in a state where the outer peripheral surface of the pipe end portion 2 and the inner peripheral surface of the counterpart member 5 are brought into abutment with each other. The brazing-filler-metal-made ring 4 is then heated inside the heating furnace or the like in the melting process to braze the engagement portion 3 to the counterpart member 5, as shown in FIG. 9. It is to be noted the brazing-filler-metal-made ring 4 is provided in an engaging manner between the engaging portion 3 and the pipe endmost portion 7 in this embodiment as described above but may be provided next to one side of the engaging portion 3 in other different embodiments, namely the side opposite to the pipe endmost portion 7 in which is the engaging portion 3 intervened.

As described above, since the brazing-filler-metal-made ring 4 is securely engaged with the engaging portion 3 of the engaging member 1 between the engaging portion 3 and the pipe endmost portion 7 by deforming the pipe end portion 2 together with the brazing-filler-metal-made ring 4 to have a cross section in an oblong shape, the brazing-filler-metal-made ring 4 is hardly detached from the pipe end portion 2, so that the brazing at the predetermined position becomes more certain and stable.

Fifth Embodiment

In the above third and fourth embodiments, the outer periphery of the pipe end portion 2 is mounted in a circumferential direction with the engaging portion 3 in a ring shape that is outwardly projecting and the brazing-filler-metal-made ring 4 is provided in an engaging manner to the engaging portion 3 between the engaging portion 3 and the endmost portion 7. In a fifth embodiment of a fourth aspect of the invention, however, the outer periphery of the pipe end portion 2 is mounted in a circumferential direction with the engaging portion in a ring shape which is outwardly projecting while an expanded diameter portion 6 is mounted to the pipe endmost portion 7 of the pipe end portion 2. In this state, the brazing-filler-metal-made ring 4 is provided in an engaging manner to the engaging portion 3 between the expanded diameter portion 6 and the engaging portion 3.

Figure 10:
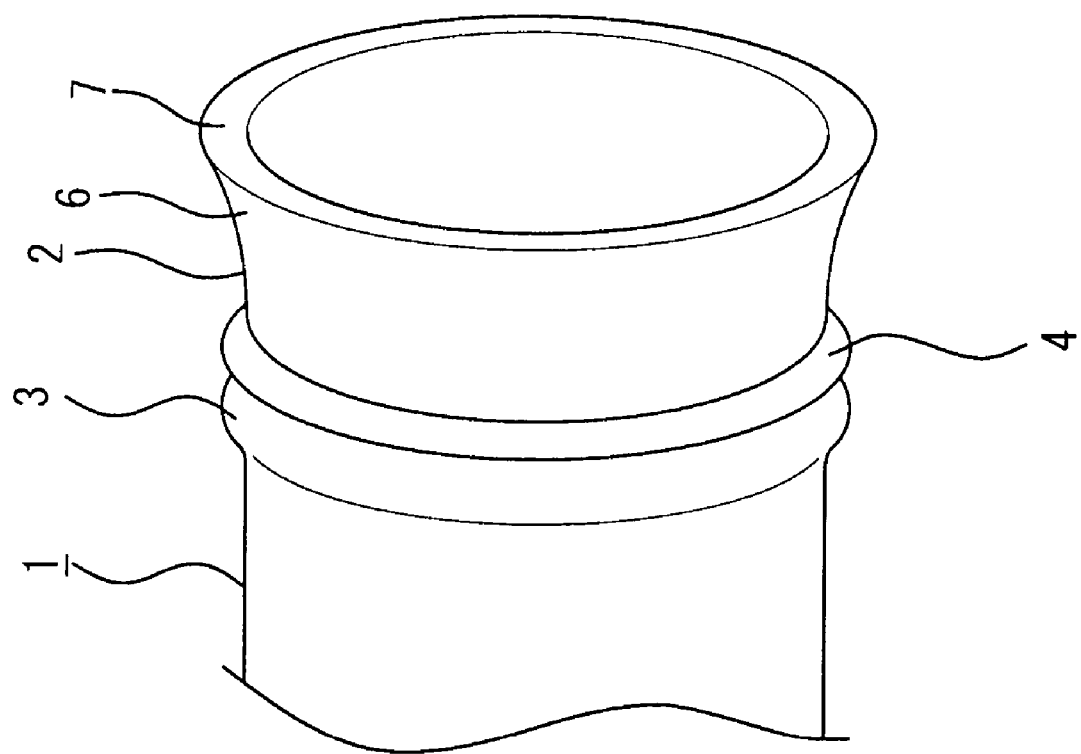
FIG. 10 is a perspective view of a pipe member provided with a brazing-filler-metal-made ring according to a fifth embodiment of a fourth aspect of this invention.

The fifth embodiment will be explained in detail with reference to FIGS. 10 and 11. The engaging portion 3 is mounted in a projecting manner to the outer periphery of the pipe end portion 2 of the pipe member 1 while the expanded diameter portion 6 is formed by uniformly expanding a diameter of the pipe endmost portion 7 of the pipe member 1 outwardly. The brazing-filler-metal-made ring 4 in a ring shape is formed in a manner to have an inner diameter smaller than the outer diameters of the expanded diameter portion 6 and the engaging portion 3. This brazing-filler-metal-made ring 4 is slid over the expanded diameter portion 6 of the pipe member 1 by elastically deforming the brazing-filler-metal-made ring 4 so that the expanded diameter portion 6 is inserted in the brazing-filler-metal-made ring 4. Therefore, the brazing-filler-metal-made ring 4 is to be provided between the expanded diameter portion 6 and the engaging portion 3 of the pipe member 1.

As described above, since the inner diameter of the brazing-filler-metal-made ring 4 is set smaller than the outer diameters of the expanded diameter portion 6 and the engaging portion 3, the brazing-filler-metal-made ring 4 elastically recovers and remains inside an interval between the engaging portion 3 and the expanded diameter portion 6. In this manner, the brazing-filler-metal-made ring 4 is provided in an engaging manner to the engaging portion 3 between the expanded diameter portion 6 and the engaging portion 3 while the pipe end portion 2 is inserted into the counterpart member 5 to braze the outer peripheral surface of the engaging portion 3 of the pipe end portion 2, which is inserted in the counterpart member 5, to the inner peripheral surface of the counterpart member 5.

Figure 11:
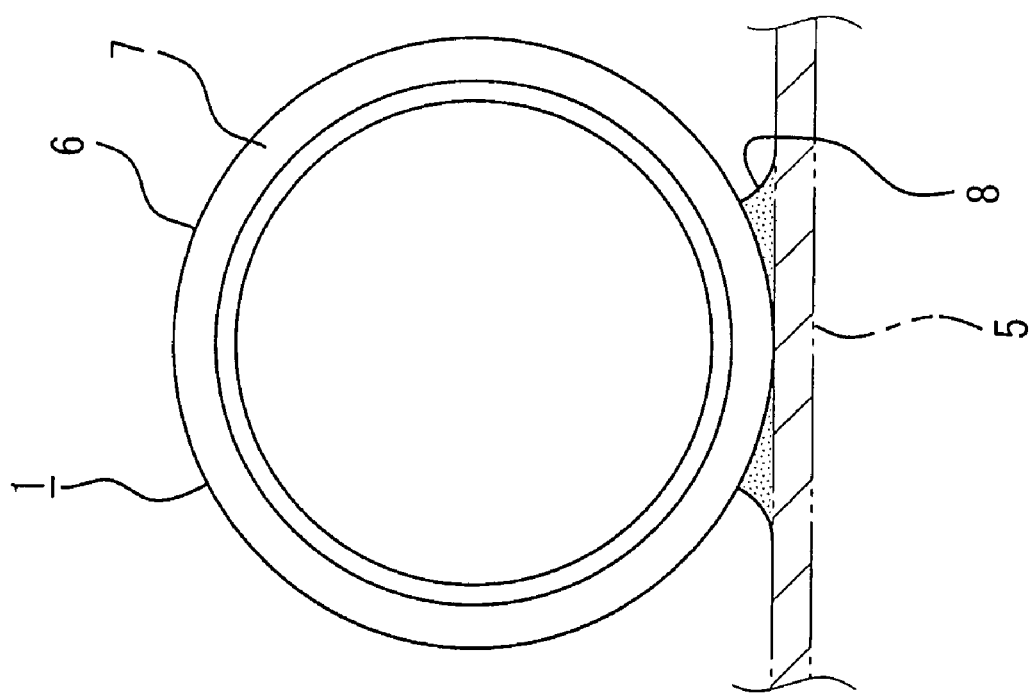
FIG. 11 is an end view of the pipe member secured by brazing into a counterpart member according to the fifth embodiment.

In this state, the melting process is performed by heating the brazing-filler-metal-made ring 4, causing the brazing filler metal to be melted and poured into the abutment portion between the outer peripheral surface of the engaging portion 3 and the inner peripheral surface of the counterpart member 5, so that this abutment portion is secured by the brazing portion 8, which has been melted and solidified, as shown in FIG. 11. At this time, since the brazing-filler-metal-made ring 4 is provided between the engaging portion 3 and the expanded diameter portion 6 of the pipe member 1 as described above, the brazing-filler-metal-made ring 4 is hardly detachable from the pipe end portion 2 during the brazing operation in sequence. As a result, the brazing operation can be certainly performed at a target position. Therefore, the brazing-filler-metal-made ring 4 can be easily positioned with respect to the pipe end portion 2. Furthermore, the expanded diameter of the pipe end portion 2 enhances reduction in flow resistance when liquid flowing through inflows and outflows.

Sixth Embodiment

Figure 12:
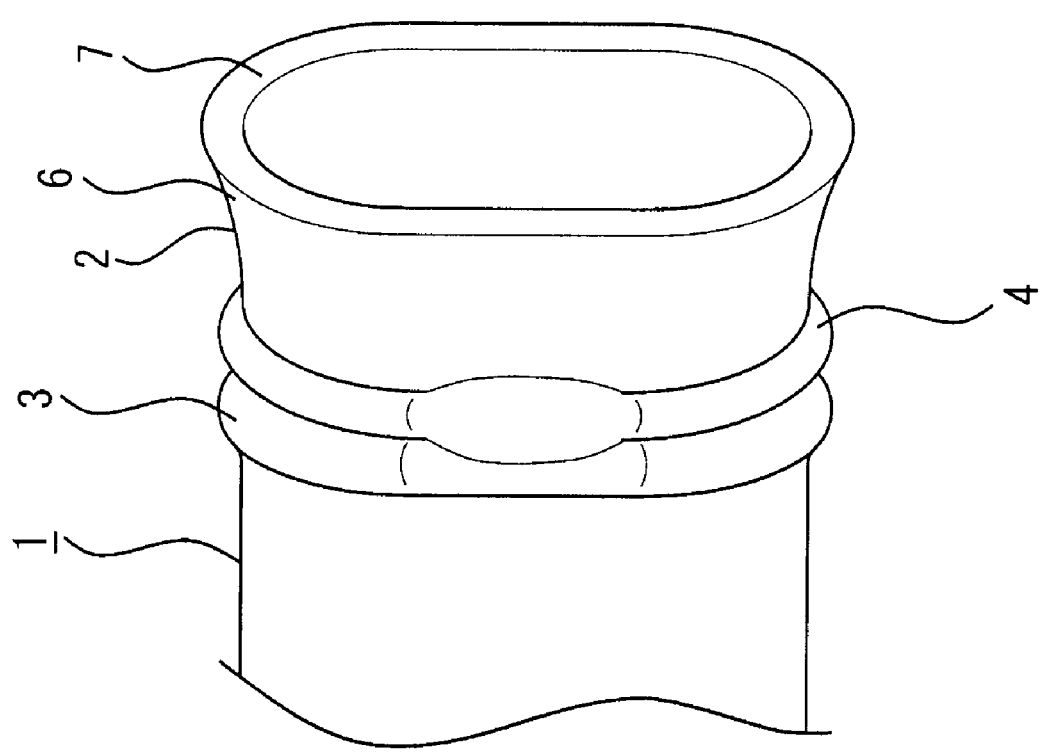
FIG. 12 is a perspective view of a pipe member provided with a brazing-filler-metal-made ring according to a sixth embodiment of the fourth aspect of this invention.

In the above fifth embodiment, the engaging portion 3 is provided in a projecting manner to the pipe end portion 2 of the pipe member in a cylindrical shape while the expanded diameter portion 6 is mounted to the pipe endmost portion 7 at a side of the pipe end portion 2 to braze the pipe end portion 2 to the counterpart member 5 by providing the brazing-fillermetal-made ring 4 to the engaging portion 3 in an engaging manner. In a sixth embodiment of the fourth aspect of the invention, the pipe end portion 2 of the pipe member 1 is mounted with the engaging portion 3 and the expanded diameter portion 3 in a manner similar to that of the fifth embodiment, and the brazing-filler-metal-made ring 4 is provided in an engaging manner to the engaging portion 3 between the engaging portion 3 and the expanded diameter potion 6. As shown in FIG. 12, the pipe end portion 12 of the pipe member 1 is pushed in a direction of the axial center from the exterior through the brazing-filler-metal-made ring 4 so that the pipe end portion 2 is deformed together with the brazing-filler-metal-made ring 4 in a manner to have a cross section in an oblong shape. The pipe member 1 thus deformed is inserted and provided to the counterpart member 5 to perform the brazing between the engaging portion 3 and the counterpart member 5.

As described above, the pipe end portion 2 of the pipe member is deformed together with the brazing-filler-metal-made ring 4 in a manner to have a cross section in an oblong shape, so that the brazing-filler-metal-made ring 4 is provided to the pipe end portion 2 in a manner to be engaged with the engaging pipe more firmly between the engaging portion 3 and the expanded diameter portion 6. Therefore, the brazing-filler-metal-made ring 4 is hardly detachable from the interval between the engaging portion 3 and the expanded diameter portion 6 even under vibration condition during the brazing operation, so that the brazing operation at a predetermined position becomes more certain.

What is claimed is:

1. A method of brazing a pipe member to a counterpart member by brazing an outer peripheral surface of a pipe end portion of the pipe member to an inner peripheral surface of the counterpart member, the method comprising:
    defining an engaging portion having a ring shape at an outer periphery of the pipe end portion;
    engaging a brazing-filler-metal-made ring comprised of brazing filler metal with the engaging portion;
    bringing the outer peripheral surface of the pipe end portion into abutment with the inner peripheral surface of the counterpart member to form an abutment portion, said abutment portion being comprised of an abutted contact area between said outer peripheral surface of the pipe end portion and the inner peripheral surface of the counterpart member, and clearance regions which are disposed between circumferentially adjacent portions of the pipe member and the inner peripheral surface of the counterpart member on both sides of the abutted contact area;
    heating and melting the brazing-filler-metal-made ring of the pipe end portion such that the brazing filler metal of the brazing-filler-metal-made ring is caused to flow circumferentially into the clearance regions of the abutment portion, thereby securing, by brazing, the pipe end portion to the counterpart member.

2. A method of brazing a pipe member to a counterpart member by brazing an outer peripheral surface of a pipe end portion of the pipe member to an inner peripheral surface of the counterpart member, the method comprising:
    defining an engaging portion in a ring shape, which is inwardly concave, at an outer periphery of the pipe end portion of the pipe member;
    engageably installing a brazing-filler-metal-made ring comprised of brazing filler metal into the engaging portion;
    bringing the outer peripheral surface of the pipe end portion into abutment with the inner peripheral surface of the counterpart member to form an abutment portion, said abutment portion being comprised of an abutted contact area between said outer peripheral surface of the pipe end portion and the inner peripheral surface of the counterpart member, and clearance regions which are disposed between circumferentially adjacent portions of the pipe member and the inner peripheral surface of the counterpart member on both sides of the abutted contact area; and
    heating and melting the brazing-filler-metal-made ring of the pipe end portion such that the brazing filler metal of the brazing-filler-metal-made ring is caused to flow circumferentially into said clearance regions of the abutment portion, thereby securing, by brazing, the pipe end portion to the counterpart member.

3. A method of brazing a pipe member to a counterpart member by brazing an outer peripheral surface of a pipe end portion of the pipe member to an inner peripheral surface of the counterpart member, the method comprising:
    defining an engaging portion in a ring shape, which is outwardly projecting, at an outer periphery of the pipe end portion of the pipe member;
    forming an expanded diameter portion by expanding a diameter of the pipe member at a region of the pipe closer to a terminal end of the pipe member than the engaging portion;
    installing a brazing-filler-metal-made ring comprised of brazing filler metal between the expanded diameter portion and the engaging portion;
    bringing the engaging portion or the expanded diameter portion into abutment with the inner peripheral surface of the counterpart member to form an abutment portion, said abutment portion being comprised of an abutted contact area between said engaging portion or the expanded diameter portion and the inner peripheral surface of the counterpart member, and clearance regions which are disposed between circumferentially adjacent portions of the pipe member and the inner peripheral surface of the counterpart member on both sides of the abutted contact area; and
    heating and melting the brazing-filler-metal-made ring of the pipe end portion such that the brazing filler metal of the brazing-filler-metal-made ring is caused to flow circumferentially into said clearance regions of the abutment portion, thereby securing, by brazing, the outer peripheral surface of the engaging portion and the inner peripheral surface of the counterpart member.

4. A method of brazing a pipe member to a counterpart member, comprising:
    defining an engaging portion proximal to a pipe end portion of a pipe member, the pipe member extending along a pipe axis, said engaging portion being defined by a region which circumscribes the pipe member having a smaller outer diameter relative to respective outer diameters of regions of the pipe on both sides of said engaging portion in a direction of the pipe axis;
    installing a brazing-filler-metal-made ring comprised of brazing filler metal into the engaging portion so as to captively retain said ring in said engaging portion;
    bringing a side of the outer peripheral surface of the pipe end portion into abutment with an inner peripheral surface of the counterpart member to form an abutment portion, said abutment portion being comprised of an abutted contact area between said outer peripheral surface of the pipe end portion and the inner peripheral surface of the counterpart member, and clearance regions which are disposed between circumferentially adjacent portions of the pipe member and the inner peripheral surface of the counterpart member on both sides of the abutted contact area; and heating and melting the brazing-filler-metal-made ring of the pipe end portion such that the brazing filler metal of the brazing-filler-metal-made ring is caused to flow circumferentially into said clearance regions of the abutment portion thereby securing, by brazing, the pipe end portion to the counterpart member.

5. The method of brazing a pipe member to a counterpart member according to any one of claims 1, 2, 3 or 4, further comprising deforming the pipe member together with the brazing-filler-metal-made ring engaged therewith into a noncircular shape by pushing the pipe end portion together with the brazing-filler-metal-made ring in a direction of an axial center from an exterior prior to insertion of the pipe member with the brazing-filler-metal-made ring into the counterpart member, so that the pipe member is insertable into the counterpart member having a correspondingly noncircular shape.

6. The method of brazing a pipe member to a counterpart member according to claim 5, wherein said defining the engaging portion includes:

forming an outwardly projecting portion at an outer periphery of the pipe end portion of the pipe member; and forming an expanded diameter portion by expanding a diameter of the pipe member at a region of the pipe member closer to a terminal end of the pipe member than the engaging portion.

7. The method of brazing a pipe member to a counterpart member according to claim 4, wherein said defining the engaging portion includes forming the engaging portion in a ring shape, which is inwardly concave relative to adjacent regions of said pipe member in the direction of the pipe axis at an outer periphery of the pipe end portion of the pipe member.

8. The method of brazing a pipe member to a counterpart member according to claim 4, wherein said abutted contact area generally extends longitudinally in a direction of the pipe axis.

* * * * *